United States Patent [19]
Forsyth et al.

[11] 3,770,060
[45] Nov. 6, 1973

[54] MODULAR FIREFIGHTING UNIT

[75] Inventors: John P. Forsyth; Robert W. Forsyth, both of Upland; Donald R. Holcomb, Ontario; Nathan N. Shiovitz, Anaheim, all of Calif.

[73] Assignee: Lockheed Aircraft Corporation, Burbank, Calif.

[22] Filed: Dec. 26, 1972

[21] Appl. No.: 318,594

[52] U.S. Cl. ................................. 169/24, 239/172
[51] Int. Cl. ............................................ A62c 27/00
[58] Field of Search ...................... 169/1 R, 2 R, 24; 239/172, 176

[56] References Cited
UNITED STATES PATENTS
2,241,857   5/1941   Hisaw ................................... 169/24
2,533,772   12/1950  DeFrees............................ 169/24 X
3,375,875   4/1968   Wesson........................... 169/2 R X Primary Examiner—M. Henson Wood, Jr.
Assistant Examiner—John J. Love
Attorney—Billy G. Corber et al.

[57] ABSTRACT

A compact firefighting unit which is a self-contained system that can be installed on an unmodified cargo truck. The equipment such as tanks, pump, hose reels and the like are mounted on a frame, which includes provisions to facilitate loading the unit on the truck and a locking mechanism for attaching the unit to the bed of the truck and requiring no modification or alteration of the truck.

4 Claims, 3 Drawing Figures

PATENTED NOV 6 1973
3,770,060
SHEET 1 OF 2
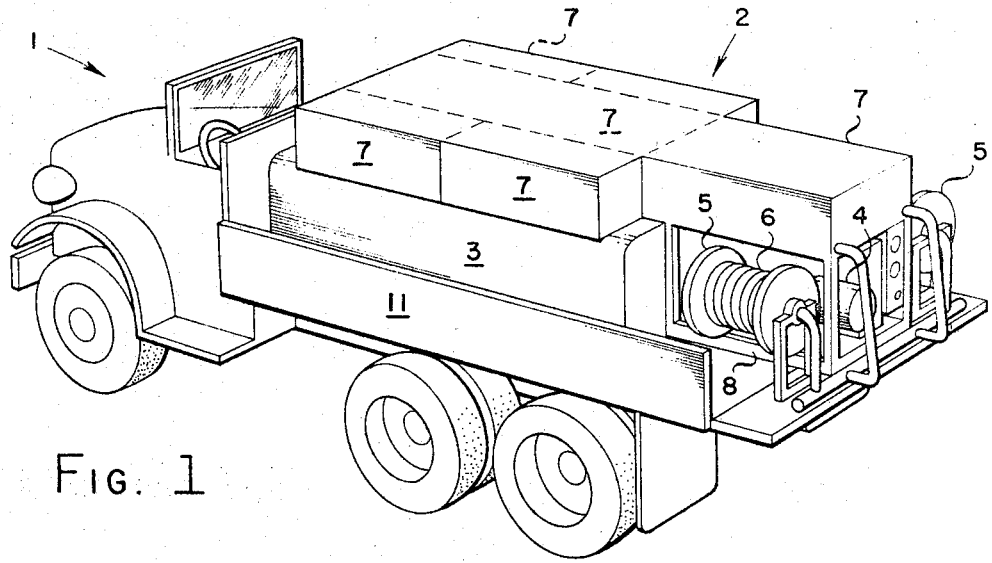
Fig. 1
Fig. 2
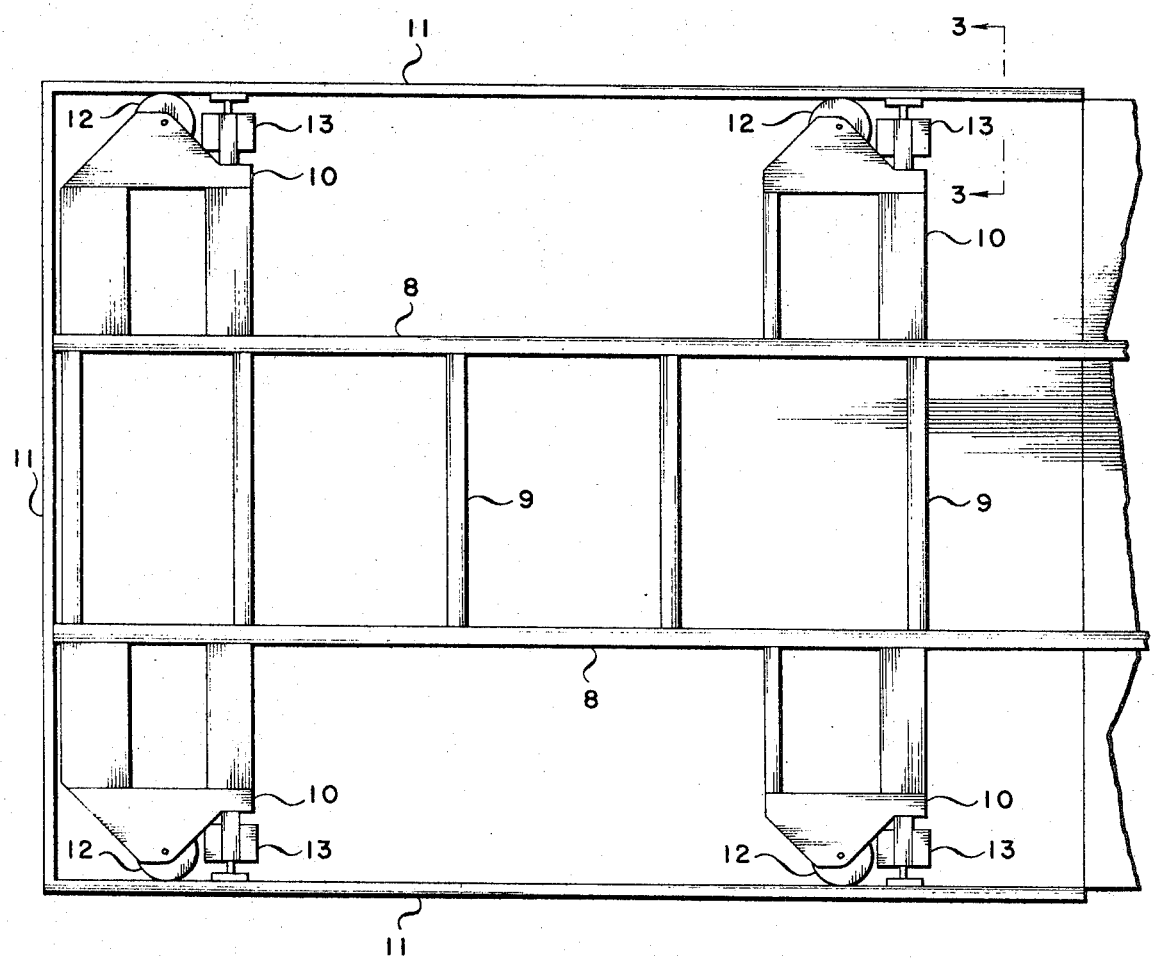

MODULAR FIREFIGHTING UNIT

Each year, the late summer season brings a heightened threat of fire to undeveloped recreational areas of the western and southwestern states. Periodically, an unusually dry spring and summer will end in conflagrations which denude watershed areas by the tens of thousands of acres. The cost of these fires in terms of the ecological damage they produce, the loss of animal and plant life, loss of the ability to retain ground water and subsequent flooding are incalculable. Their costs, in terms of the fire-fighting efforts they necessitate, are both calculable and staggering. These latter costs are even more significant when consideration is given to the relative ineffectiveness of the techniques fire fighters are forced to adopt, lacking equipment in adequate numbers and plagued by the limitations of the equipment that is available.

The mainstay of the suburban and rural fireman is still, unfortunately, the "metropolitan" firetruck, where the terrain will permit its use, and the shovel, assorted brush tools and the backpack for inaccessible terrain. The principal disadvantage of the metropolitan fire truck in this role is its lack of mobility in rugged areas where early action can prevent small fires from spreading into conflagrations. Yet, specialized firefighting vehicles with the required mobility are expensive, from the standpoint of both initial cost and utility, and consequently cannot be made available in quantities sufficient to cover even a minimum of the high fire-hazard areas.

In an effort to make better use of the fire-fighting capabilities of available metropolitan units, the forest services utilize earth moving equipment, both before and during fires, to create roadways marginally suitable for the trucks. Fire roads prepared and maintained on a continuing basis are located where experience indicates they will be most useful during an emergency. These roadnets must usually be expanded after a fire starts to provide real access for fire equipment. This, of course, takes time — time during which the fire is spreading without effective means of control — and exposes men and equipment to the very real risk of being cut off and trapped by a fast-moving fire. The bulldozers are also used to clear fire-breaks and prepare protective earthworks. Frequently, because they are somewhat more mobile than the conventional metropolitan fire units, these vehicles must be diverted to patrol fire lines and handle hot spots.

There are, however, many vehicles which have the required mobility, have already been publicly acquired and maintained, and which can be made available in time of fire emergencies. As a matter of fact, these vehicles are often pressed into service at such times to transport firefighters armed with hand tools into the fire zone. These vehicles are the high mobility, 6 × 6 military cargo trucks common to every local National Guard and Military Reserve Unit.

Accordingly, it is a principal object of the invention to provide a firefighting system which is simple, compact and can be readily installed on an unmodified cargo truck.

A further object of the invention is to provide a high-mobility, firefighting system.

A further object of the invention is to provide modular units which can be placed at strategic points and moved into critical areas with maximum dispatch.

An additional advantage of the invention is that the completely self-contained module may be air-lifted by helicopter to remote mountainous sites.

These and other objects and advantages will become more apparent when taken with the accompanying drawings, in which:

FIG. 1 is a perspective view of a typical cargo truck showing the firefighting unit installed;

FIG. 2 is a plan view of the main frame of the unit and showing details of the invention.

Figure 3:
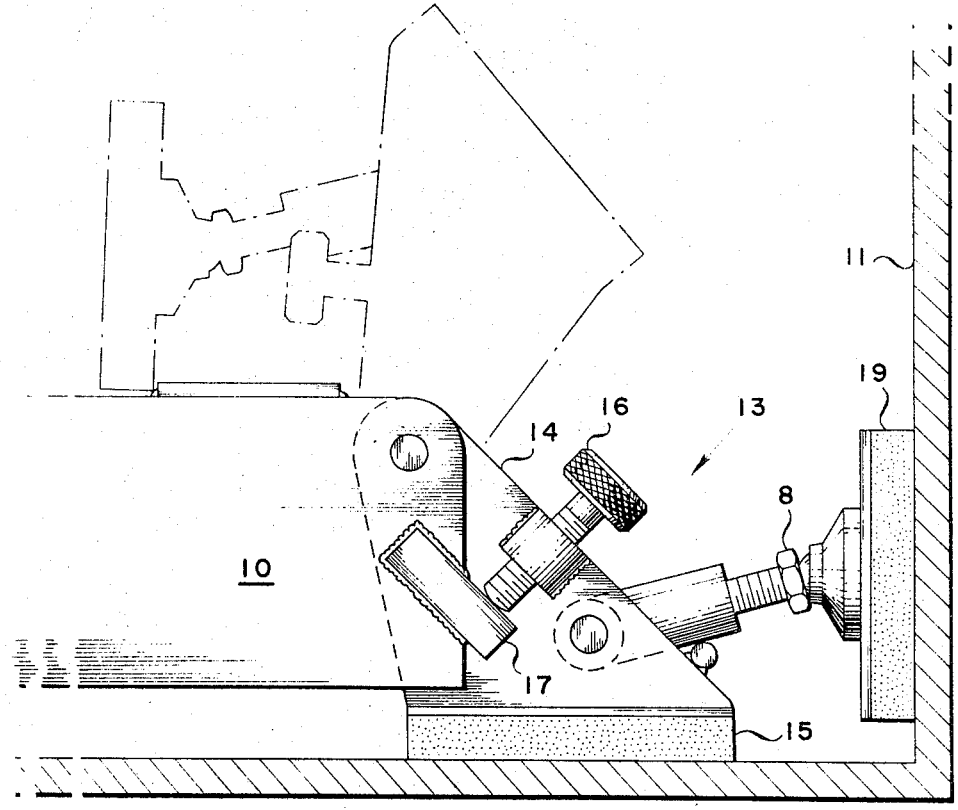
FIG. 3 is a vertical view taken on the line 3—3 of FIG. 2 and illustrating further details of the locking mechanism.

With reference to FIG. 1, a standard cargo truck 1 is illustrated with a modular firefighting unit installed in the bed thereof. The modular unit generally designated 2 may consist of a tank 3 of a capacity of about 1,000 gallons of fire-retardant material such as water or the like, a pump 4 and hose reels 5, with suitable hoses 6 as indicated. The pump is driven by an engine (not shown) which would also drive an alternator for lighting and/or battery charging. A plurality of cabinets 7 are located above the tank for storage of various firefighting tools and equipment. The tank is preferably mounted on a main support frame consisting of two longitudinal tubular skids 8 and cross members 9, which also provide mounting structure for the hose reels and pump. Additional structural members integral with the tank assembly provide attachment points for an operator's platform and handrail assembly (not shown) and the storage cabinets.

In FIG. 2, the tubular supports 8 and connecting cross members 9 are shown along with the inventive improvement. Approximately at each corner of the supporting frame 8-9 are four units 10 which provide for the loading and locking functions. The outline of the truck bed is indicated at 11. As shown, the firefighting unit is in place in the truck bed and locked in position. Adjacent the sides of the truck bed on each unit 10 are rollers 12 which facilitate rapid and easy loading, keeping the unit accurately centered in the truck bed 11 as it is moved from a stationary site strategically located onto the truck. Each unit 10 also includes a locking mechanism, shown in more detail in FIG. 3. With the invention as described and claimed, no modification of the existing truck is required. The modular unit is simply loaded into the truck bed, locked in position and moved into the more inaccessible terrain areas for greater efficiency and more effective fire control.

Referring now to FIG. 3, the locking mechanism 13 will now be described, it being understood that the centering rollers 12 are behind the locking mechanism 13 and not shown in FIG. 3. The solid lines indicate the locked position, while the broken lines indicate the unlocked position during loading of the firefighting modular unit. The locking mechanism consists of a pivoted member 14 and a pad assembly 15, 19. The pad assembly is lowered so that the pad 15 makes firm contact with the truck bed. Parallel alignment of the pad is provided by the adjusting screw 16 against fixed member 17. Once the pad 15 is lowered into place, the nut 18 is adjusted to force the vertical pad 19 firmly against the body side wall which, together with the pad 15 at each corner of the unit, locks the firefighting unit firmly in the truck bed. It is believed that equivalent locking means will be apparent to those skilled in the art.

A typical operation of loading and unloading the firefighting unit will now be described. The modular unit will normally be stored in critical areas on a permanent rack or stand at approximately the height of the truck bed. The rack or stand should be equipped with suitable winches, cables and pulleys to assist in moving the modular unit to or from the stand. Assuming the modular unit is on the stand, the cable is attached to the rear of the module with the cable laid over an intermediate drum at the front of the platform and thence routed to the winch drum at the rear of the platform. The truck is then positioned near the center line of the stand, and operation of the winch quickly moves the module forward into the truck, with the rollers 12 providing accurate centering of the module within the truck bed. When the transfer operation is complete, i.e., themodule reaches the front of the truck body, the cable is released and the module locked in place as previously described. The transfer of the modular unit from the truck back to the storage stand or rack is substantially in reverse operation to the above, except that the cable, attached to the rear of the module, is routed directly to the winch drum at the rear of the platform.

What is claimed is:

1. A compact modular firefighting unit adaptable for mounting on a truck bed comprising a supporting frame, a plurality of tanks mounted on the frame, means for dispensing fire-retardant material from the tanks, a plurality of centering and locking mechanisms attached to the supporting frame, each such mechanism comprising
   at least one roller adapted for rotation in a horizontal plane,
   a locking pad assembly having at least one adjustable pad for engagement with the truck bed, and
   at least one other adjustable pad for engagement with the side wall of the truck bed.
2. The firefighting unit as defined by claim 1, and wherein a centering and locking mechanism is attached to the supporting frame at substantially each corner thereof.
3. The firefighting unit of claim 1 and further including means for transferring the unit to and from a mobile vehicle.
4. The firefighting unit of claim 1 and further including storage space for firefighting equipment.

* * * * *